United States Patent [19]

Scott et al.

[11] 4,128,800

[45] Dec. 5, 1978

[54] VEHICULAR BATTERY CHARGING SYSTEM

[76] Inventors: John P. Scott, 44 Crane Dr., San Anselmo, Calif. 94960; Dudley C. Peters, 6550 Vicksburg Pl.; Richard C. Foster, 11750 W. Eight Mile Rd., both of Stockton, Calif. 95207

[21] Appl. No.: 699,137

[22] Filed: Jun. 23, 1976

[51] Int. Cl.² ................... H02J 7/14; F16H 37/00
[52] U.S. Cl. .......................... 322/28; 74/13; 290/54; 320/61; 331/114
[58] Field of Search ............ 290/1, 3, 54; 320/2, 320/61, 64, 68; 74/13, 14; 322/28, 73, 35, 40; 331/113 R, 144; 321/1

[56] References Cited

U.S. PATENT DOCUMENTS

| | | | |
|---|---|---|---|
| 1,400,793 | 12/1921 | Bouche | 322/1 |
| 1,565,908 | 12/1925 | Conwell | 320/28 X |
| 3,049,928 | 8/1962 | Boughner | 74/13 |
| 3,617,857 | 11/1971 | Gunderson | 322/73 X |
| 3,641,416 | 2/1972 | Riff | 320/61 |
| 3,675,160 | 7/1972 | Staker | 331/144 X |
| 3,740,668 | 6/1973 | Chopra | 331/113 R |

Primary Examiner—Robert J. Hickey

Attorney, Agent, or Firm—Townsend and Townsend

[57] ABSTRACT

A vehicular battery charging system particularly adapted for railroad cars such as cabooses, in which an axle drive/hydraulic pump unit is coupled to the end of an axle via a flexible coupling and right angle gear drive. The hydraulic pump provides hydraulic pressure to a hydraulic motor/alternator unit. The a.c. output from the alternator is rectified and the resulting d.c. is employed to charge the batteries at a voltage which is very accurately controlled by a voltage regulator. The regulator comprises a switching circuit controlling the excitation of the field or rotor winding of the alternator by the rectified alternator output, in response to a repetitive pulse signal from a free-running multi-vibrator. The duty cycle of the multi-vibrator pulse signal is controlled in response to the output voltage of the alternator, forming a closed loop feedback system whereby excitation to the alternator is controlled in response to the output thereof to maintain a very constant, predetermined output voltage suitable for battery charging. Overload protection circuitry is included to limit rotor excitation should the field windings be accidentally short circuited.

17 Claims, 9 Drawing Figures

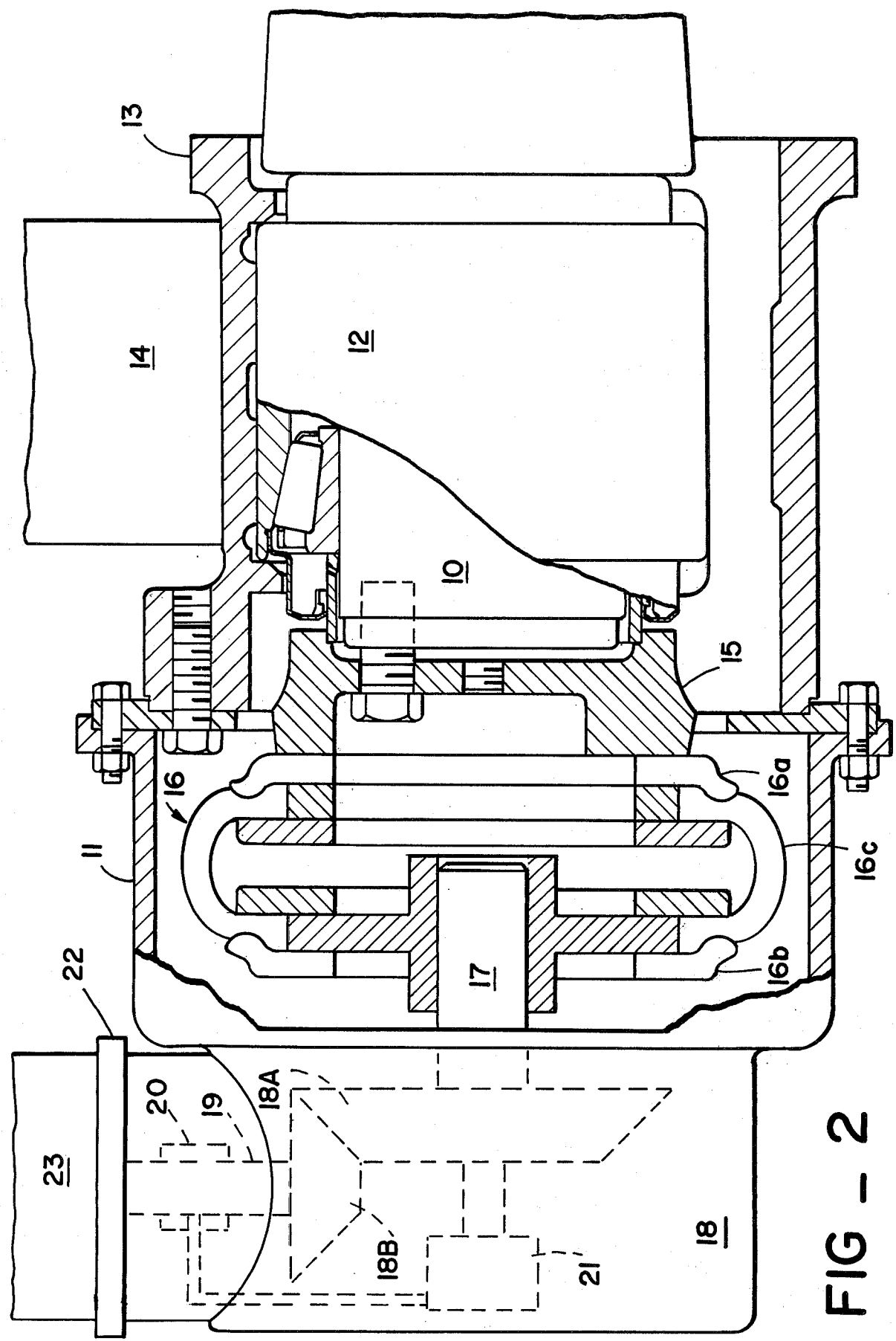

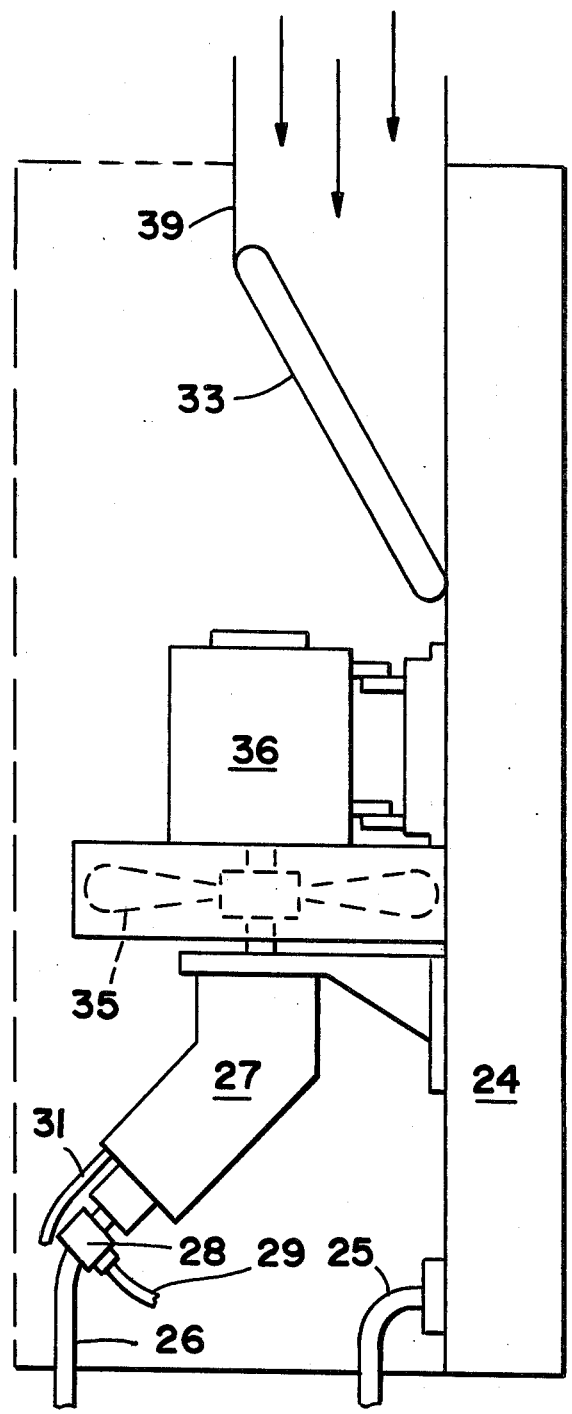
FIG_3

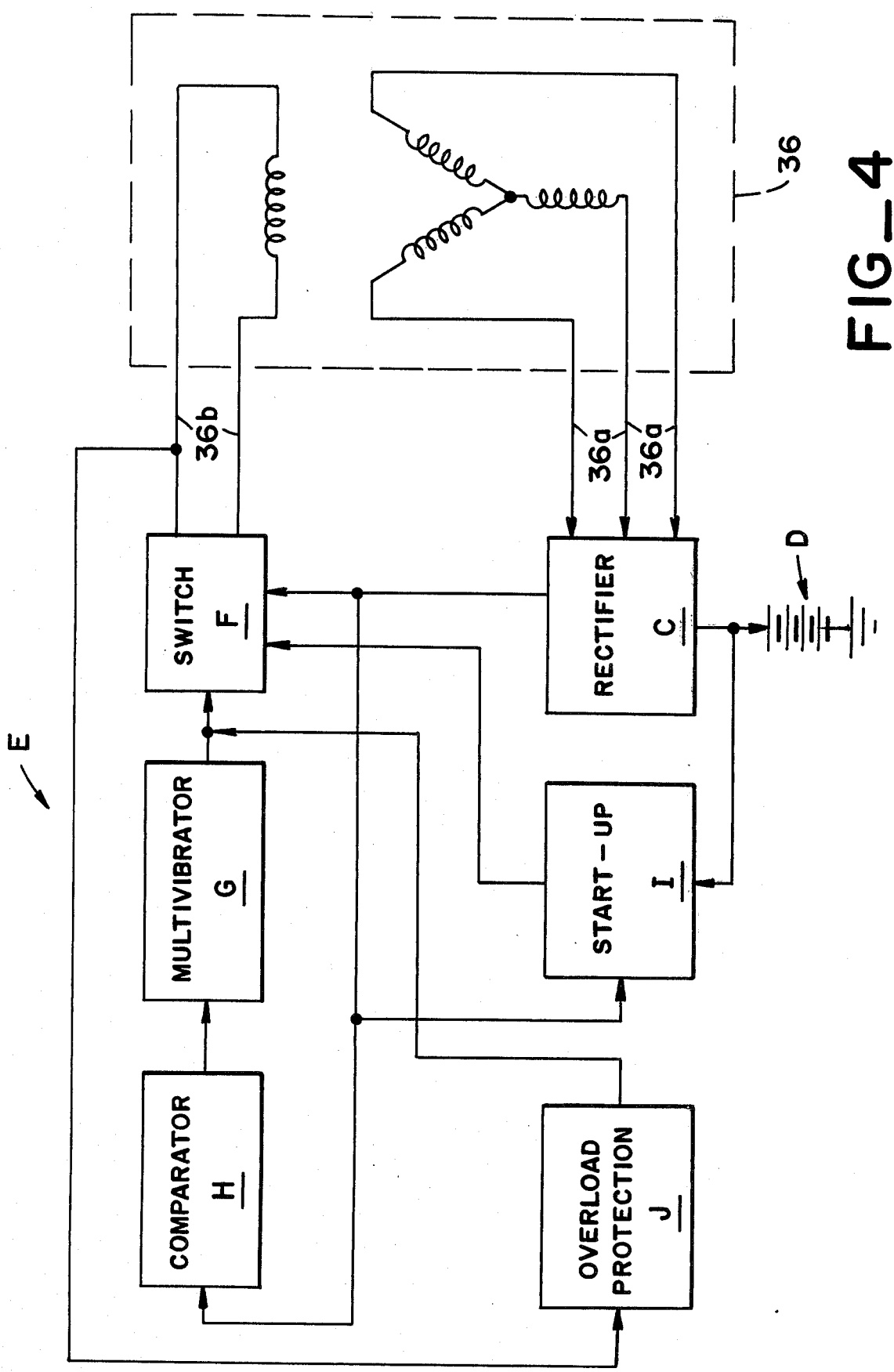
FIG_4

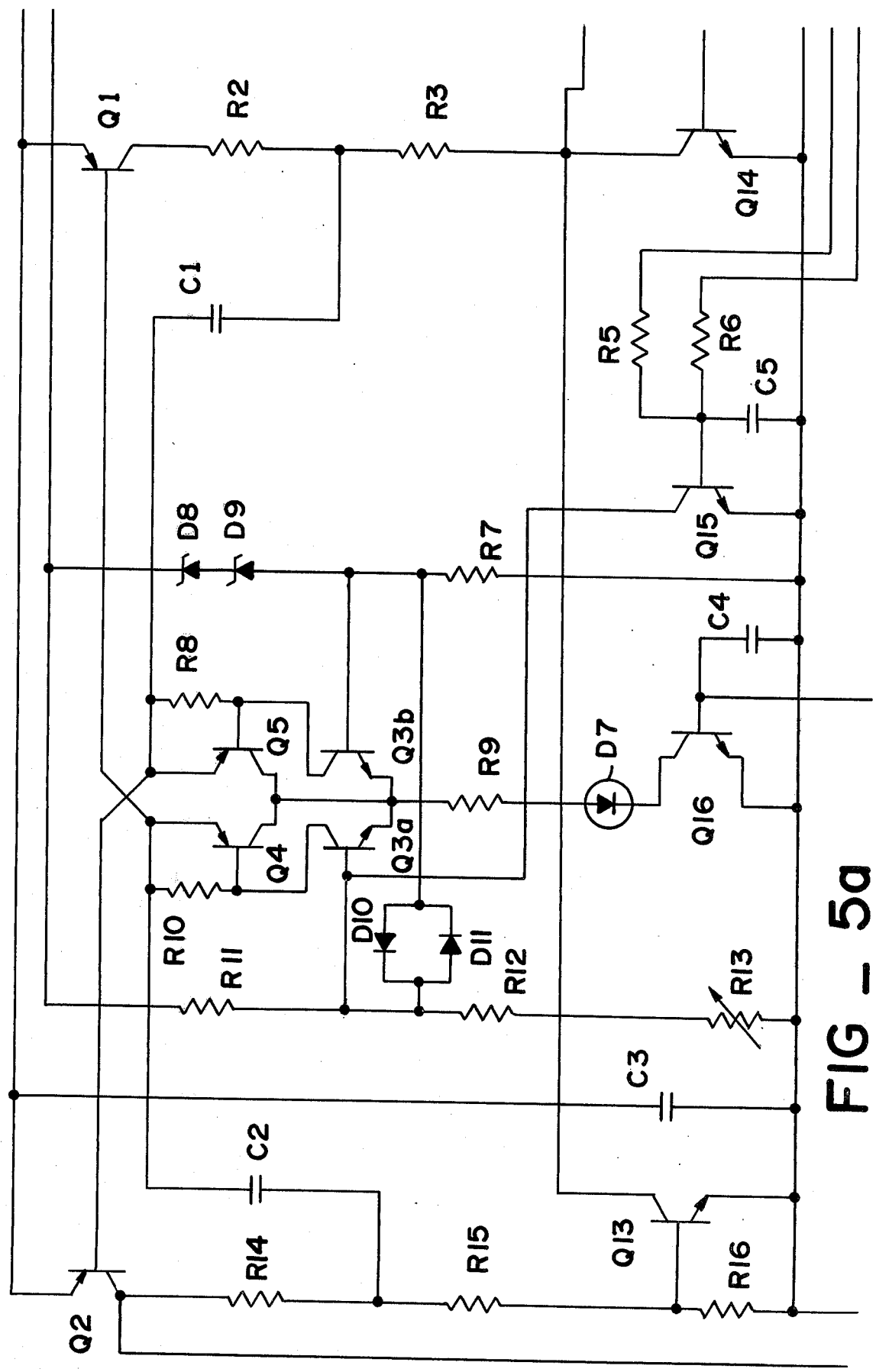
FIG_5a

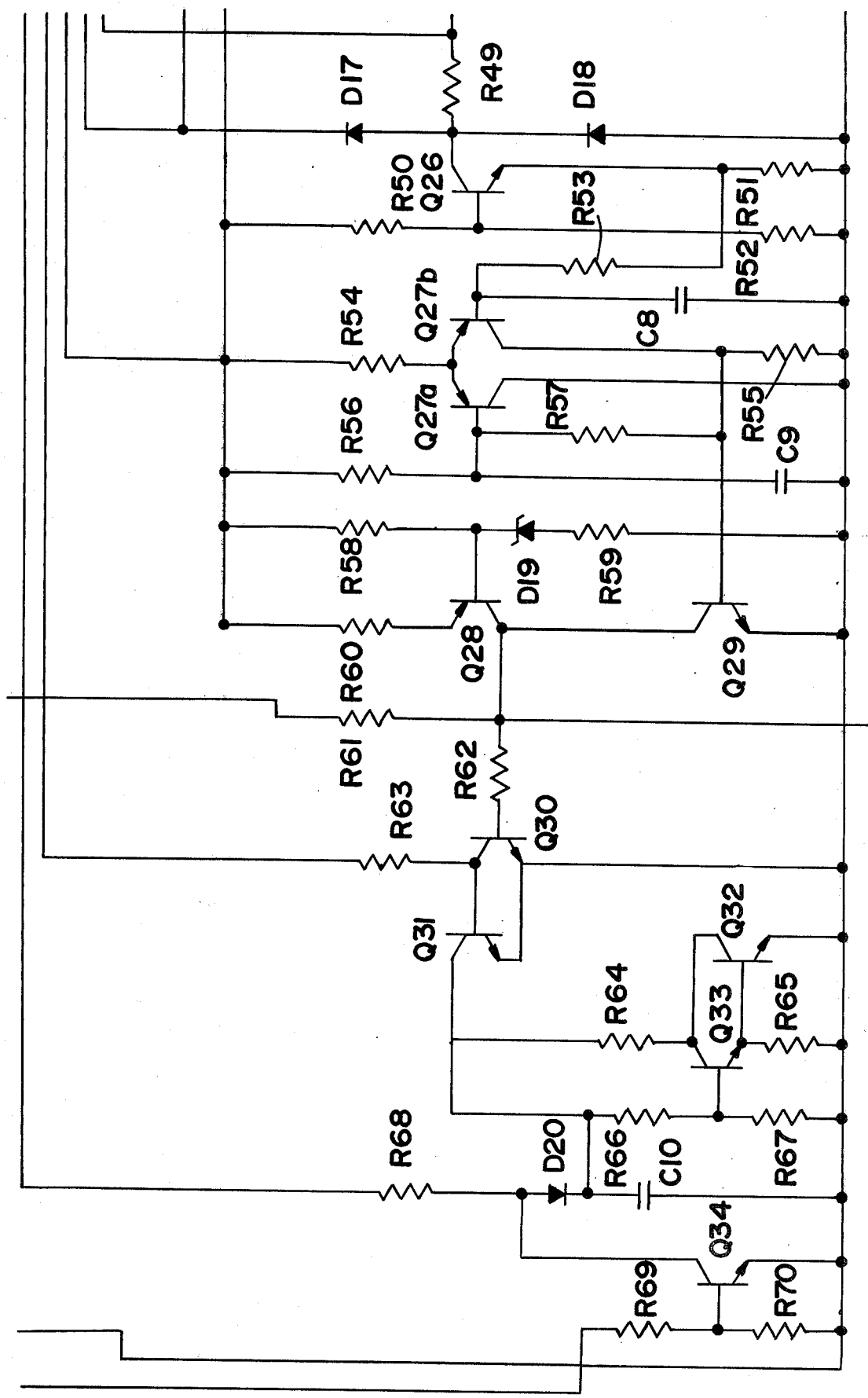
FIG_5c

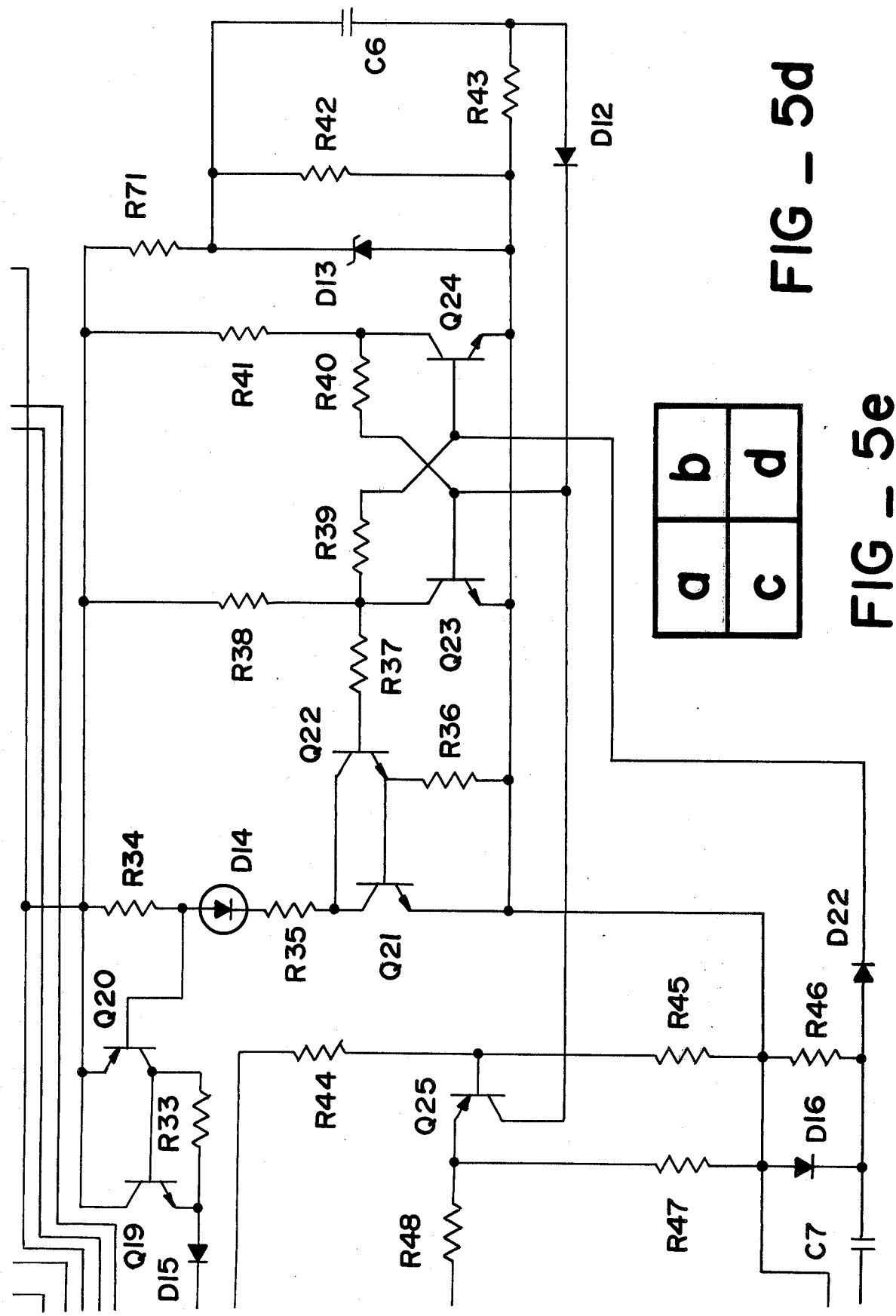

VEHICULAR BATTERY CHARGING SYSTEM

This invention relates to battery charging systems for vehicles and, more particularly, to a battery charging system particularly adapted for railroad cars such as cabooses and railroad locomotives.

Vehicular battery charging systems generally employ rotational energy derived from a rotating shaft of the vehicle to drive a generator or alternator which produces electrical energy to charge the batteries of the vehicle. The most common form of rotational drive comprises a "V"-belt and pulleys connecting a rotating shaft of the vehicle and the generator. In recent years, the use of electrical equipment on vehicles has increased dramatically, necessitating the use of higher capacity batteries and battery charging systems. For example, it is now desired to employ air conditioning systems in railroad cabooses, such air conditioning systems having electrical requirements generally exceeding the capacity of conventional caboose electrical systems. Specifically, the torque requirements of a generator or alternator of sufficiently high capacity generally exceed the torque transmitting capabilities of conventional "V"-belt drives.

One relatively recent attempt at a high capacity battery charging system for railroad cabooses has been made by the Safety Electrical Equipment Corp. of New Haven, Conn., in the form of an alternator mounted adjacent the end of one of the axles of the caboose and rotationally driven thereby through a right angle gear drive. This system possesses several distinct drawbacks. Specifically, the operation of the gear drive is critically dependent on accurate mounting and alignment, as a result of which such systems have been plagued by mechanical drive failures. The alternator is carried outboard of the wheel and is exposed to a harsh environment including moisture, dust as well as debris airborne by the motion of the train. Moreover, the regulator circuitry employed by the Safety Electrical Equipment Corp. to control the alternator output and thus the battery charging has proven to be relatively ineffective and unreliable, as evidenced by numerous electrical failures such as battery overcharging. In addition, effective overload protection is absent, rendering the system unduly susceptible to electrical failure, for example, when an accidental short circuit is placed across the field windings.

Accordingly, it is an object of the present invention to provide a vehicular battery charging system having a mechanically reliable, relatively high torque drive.

Another object of the present invention is to provide a vehicular battery charging system having a hydraulic pump driven at one end of an axle of the vehicle, hydraulically coupled to a remote hydraulic motor which, in turn, drives an alternator.

Yet another object of the present invention is to provide a vehicular battery charging system having a highly reliable and effective voltage regulator circuit.

A further object of the present invention is to provide a vehicular battery charging system having a voltage regulator including a field excitation switching circuit controlled by a repetitive pulse signal from a free running multi-vibrator, the duty cycle of which is controlled in response to the output voltage of the alternator, to form a closed loop feedback system.

Still a further object of the present invention is to provide a vehicular battery charging having overload protection circuitry to limit field excitation should the field windings become short circuited.

To these ends, there is provided a vehicular battery charging system for vehicles such as railroad cabooses in which an axle drive/hydraulic pump unit is coupled to the end of one of the axles of the vehicle via a flexible coupling and right angle gear drive. The hydraulic pump utilizes rotational energy from the axle to provide hydraulic to a hydraulic motor/alternator unit disposed remote from the pump. The a.c. output from the alternator is rectified and the resulting d.c. is employed to charge the batteries at a voltage which is very accurately controlled by a voltage regulator.

The voltage regulator according to the present invention generally comprises a switching circuit controlling the excitation of the field or rotor winding of the alternator by the rectified alternator output, in response to a repetitive pulse signal from a free-running multi-vibrator. The duty cycle of the multi-vibrator pulse signal is controlled in response to the output voltage of the alternator, forming a closed loop feedback system whereby excitation of the alternator is controlled to maintain a very constant, predetermined output voltage ideally suited for battery charging. Start-up circuitry is provided to apply battery voltage to the alternator rotor during start-up and at very low speeds. In addition, overload protection circuitry is included to limit rotor excitation if an accidental short circuit is applied across the field windings of the alternator.

The vehicular battery charging system according to the present invention thus provides an efficient, relatively high capacity drive of improved mechanical reliability. The flexible coupling between the drive and axle substantially eliminates mechanical failure due to inaccurate mounting, shaft misalignment and the like. The alternator may be disposed remote from the axle drive, interior of the vehicle and out of harm's way.

The voltage regulator circuitry employed in accordance with the present invention provides very accurate control of the battery charging voltage, resulting in prolonged battery life. The overload protection circuitry provided insures a high degree of electrical reliability under adverse conditions such as a short circuited field.

These and other objects, features and advantages of the present invention will be more readily apparent from the following detailed description of the preferred embodiment, wherein reference is made to the accompanying drawings, in which:

FIG. 2 is a side cross-sectional view of the axle drive/hydraulic pump unit of the apparatus depicted in FIG. 1;

FIG. 3 is a side elevation view of the hydraulic motor/alternator unit of the apparatus depicted in FIG. 1;

FIG. 4 is a block diagram of the voltage regulator depicted in FIG. 1;

Figure 5B:
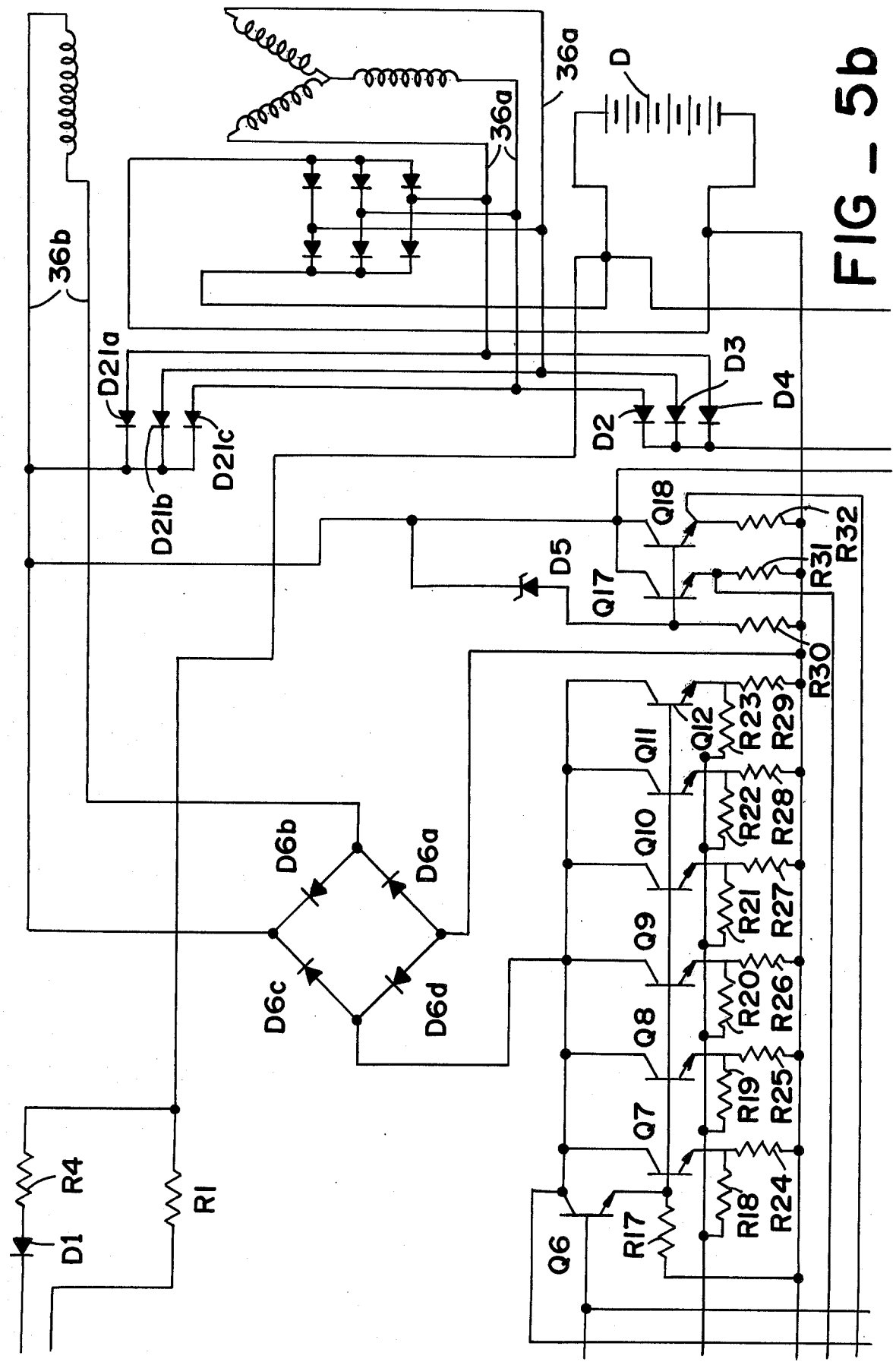

FIGS. 5a–d are schematic diagrams, which, when appropriately juxtaposed, form a schematic diagram of the voltage regulator depicted in FIG. 4; and FIG. 5e illustrates the manner of juxtaposition of FIGS. 5a–d to form a complete schematic diagram.

Figure 1:
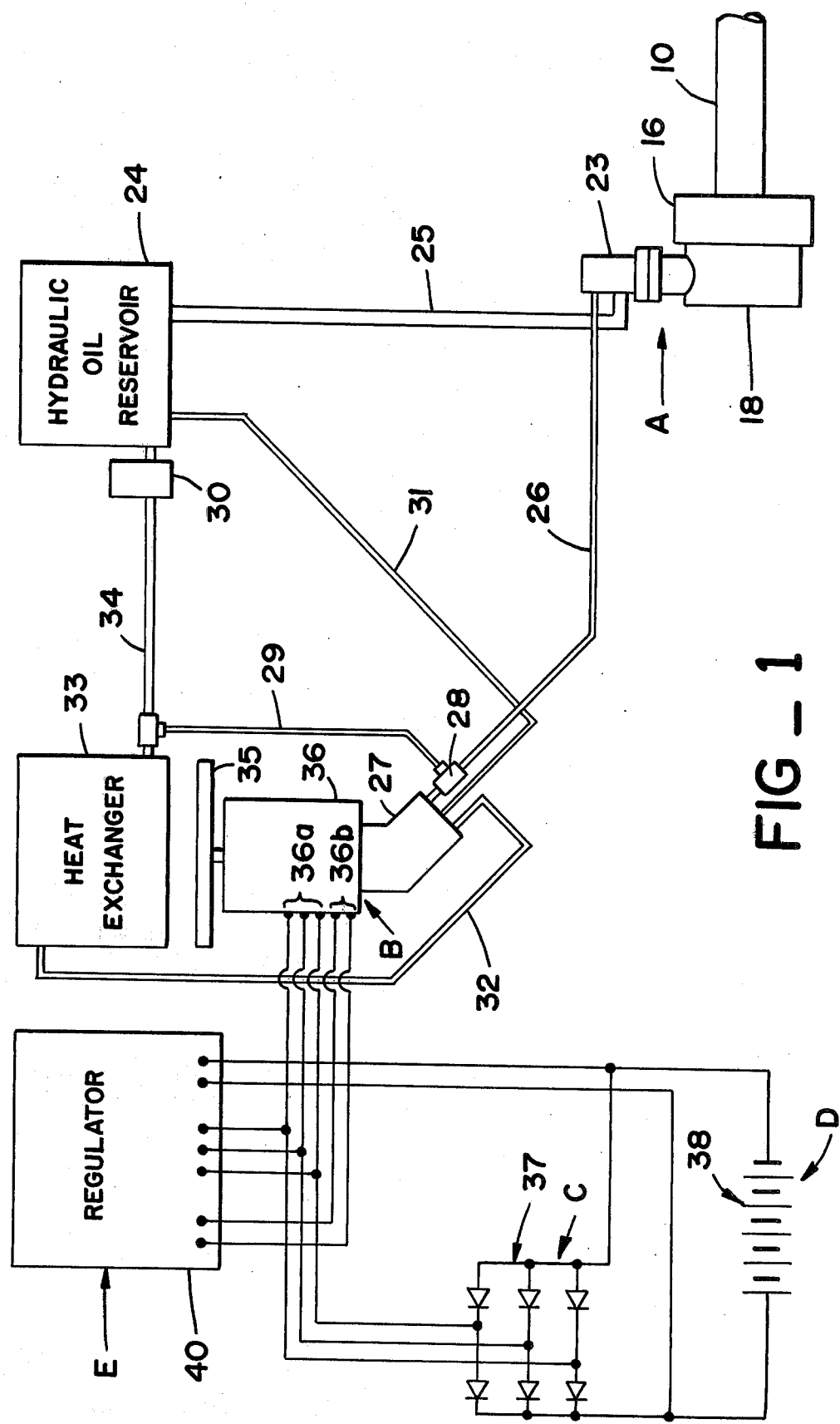
FIG. 1 is a block diagram of a vehicular battery charging system according to the preferred embodiment of the present invention.

Referring initially to FIG. 1, there is depicted in a block-form a battery charging system for vehicles in accordance with the preferred embodiment of the present invention wherein the vehicle comprises a railroad car such as a caboose. The charging system generally comprises an axle drive/hydraulic pump unit A which utilizes rotational energy from an axle 10 of the caboose to provide hydraulic pressure to drive a hydraulic motor/alternator unit B. The a.c. output from the alternator is rectified by rectifier C and the resulting d.c. is used to charge battery D at a voltage which is accurately controlled by a voltage regulator E.

In greater detail, one end of the caboose axle 10 is connected by a flexible coupling 16 to the input shaft of a right angle drive gearbox 18 whose output shaft drives a hydraulic pump 23. Low pressure oil input to the hydraulic pump 23 is provided from a hydraulic oil reservoir 24 through a supply hydraulic line 25. The hydraulic pump 23 is preferably bi-directional so that positive pressure is present on the output hydraulic line 26 of the pump regardless of the direction of rotation of the axle 10. This output pressure is transmitted through output hydraulic line 26 to the input port of a hydraulic motor 27.

A pressure relief valve 28 is provided on line 26 as a safety feature to protect the system from adverse effects in the event of excessive pressure, by allowing, under those circumstances, oil to return directly to the reservoir 24 through a standard hydraulic line 29 and a filter 30. Likewise, a pressure relief line 31, directed to the hydraulic oil reservoir 24 from a relief port of the motor 27, is provided to vent the hydraulic motor 27 should excessive internal pressure occur.

The hydraulic oil, whose temperature has been increased by operation of the pump 23 and motor 27, is conducted by a return hydraulic line 32 to a heat exchanger 33, whose output is returned through a standard hydraulic line 34 to the filter 30 and thence to the hydraulic oil reservoir 24.

The output shaft of the hydraulic motor 27 is connected to a fan 35, which is used to draw air past the heat exchanger 33 and the hydraulic motor/alternator unit B, and is further connected to the shaft of an alternator 36, preferably of the three-phase type. The three-phase a.c. outputs 36a of the alternator 36 are connected to a bridge rectifier 37 whose positive and negative d.c. outputs are connected across an array of lead-acid batterys 38 which are to be charged. In accordance with the preferred embodiment of the present invention, 32 lead-acid battery cells are connected in the series to cause the nominal output of the battery array 38 to be approximately 64 volts.

The three-phase outputs of the alternator 36 are inputed to a voltage regulator 40 to supply field or rotor excitation. The positive and negative terminals of the battery array 38 are also connected to the voltage regulator 40 as a power supply therefor. To prevent overcharging of the batteries 38, the voltage regulator 40 functions to control the output of the alternator 36. To this end, the output of the voltage regulator 40 is connected to the rotor windings 36b of the alternator 36 to supply controlled d.c. excitation for the alternator 36 from the alternator output or battery supply, in a manner to be described hereinafter.

Referring to FIG. 2, the axle drive/hydraulic pump unit A will now be described in greater detail. A cylindrical mounting flange 13 is disposed between the axle bearing 12 and the lower surface of the axle truck 14. Caboose axles generally employ a standard size bearing 12 known as a 5½ × 10 bearing, and a suitable mounting or adapter flange 13 therefor is manufactured by Brenco, Inc. of Petersburg, Va.

A flexible coupling housing 11, enclosing a flexible coupling 16, is bolted to mounting flange 13. A modified bearing cap 15 is connected to the input plate 16a of the flexible coupling 16, attached to the end of the axle by three cap screws into the holes conventionally provided for a standard bearing cap.

Flexible coupling 16 is employed to couple the bearing cap 15 to the driven shaft 17 of the right angle drive gearbox 18. In the preferred embodiment, the flexible coupling 16 comprises a PX-110 "Paraflex" flexible coupling manufactured by Dodge Manufacturing Division of Reliance Electric Company of Mishawaka, Ind. This coupling consists of parallel input and output plates 16a and 16b secured on opposite sides of a thick rubber hollow half-torus 16c, resembling an automobile tire. This coupling obviates the adverse effects which would otherwise result from angular misalignment or offset between the axle 10 and gearbox input shaft 17. The output plate 16b of the flexible coupling has a splined central hole to mate with the splined driven shaft 17 of the right angle drive gearbox 18.

The right angle drive gearbox 18 consists of a conventional ring 18A and pinion 18B gear arrangement with a preferred drive ratio of from about 4.0 to 1 to about 3.75 to 1. The gear teeth are preferably straight-cut in order to facilitate proper operation regardless of direction of rotation of the axle. The ring gear 18a is splash lubricated by the oil in the gearbox 18. In the preferred embodiment, lubrication is provided to the pinion bearing 20 near the top of the gearbox by means of an oil pump 21 interior of the gearbox 18 and driven off the end of the driven shaft 17.

A conventional hydraulic pump 23 is bolted to the hydraulic pump mounting flange 22 of the gearbox housing 18 and is driven by the output shaft 19 attached to the pinion gear 18b. Hydraulic pump 23 is preferably bi-directional to insure that there is positive pressure at the output line 26 regardless of the direction of rotation of the axle 10, thus eliminating the need to employ check valves in the hydraulic system. The hydraulic pump 23 preferably has an output flow rate which is relatively constant as its driven shaft speed varies over the usual operating range, thereby limiting the speed of the hydraulic motor 27 and obviating the need for a governor. In the preferred embodiment, a Model PFS-1021 axial piston hydraulic pump manufactured by Rivett Division of Applied Power Industries Incorporated of Pewaukee, Wis., is employed.

FIG. 3 shows a side elevation view of the hydraulic motor/alternator unit B and hydraulic tank 24 as they are preferably mounted in the interior of a conventional caboose electrical locker. In the preferred embodiment, a relatively thin rectangular hydraulic oil tank 24 of approximately 50 gallon capacity is fitted into the rear of the locker. The front of this tank is preferably provided with mounting brackets for the attachment of hydraulic motor 27, alternator 36 and heat exchanger 33.

A standard flexible hydraulic line 25 is connected near the bottom of a hydraulic oil tank 4 and runs to the hydraulic pump/axle drive unit A through the floor of the caboose to provide low pressure hydraulic oil input to the hydraulic pump 23. The output hydraulic pressure from hydraulic pump 23 is preferably conducted to the interior hydraulic motor/alternator unit B by a standard flexible hydraulic line 26 which is connected to a conventional pressure relief valve 28. Should excessive pressure occur on line 26 the pressure relief valve 28 allows the hydraulic oil to return directly to the hydraulic oil reservoir 24 through a standard flexible hydraulic line 29 and conventional filter 30 (shown in FIG. 1) thus protecting line 26 and the hydraulic motor 23. In the preferred embodiment, the pressure relief valve 28 operates at 4,000 psi.

Under normal conditions, the high pressure hydraulic oil is conducted to the inlet port of a hydraulic motor 27. In the preferred embodiment hydraulic motor 27 is a Model F11B-10 manufactured by the Hydraulic Division of Volvo of America Corporation of Rockleigh, N.J. A pressure relief line 31 consisting of a standard flexible hydraulic line allows hydraulic oil to return from the hydraulic motor casing 27 directly to the hydraulic oil reservoir 24 in the event that excessive internal pressure should occur, thereby protecting the seals in hydraulic motor 27. The heated output oil from hydraulic motor 27 is preferably conducted through a standard flexible hydraulic line 32 (shown in FIG. 1) to a conventional heat exchanger 33 preferably capable of handling a pump flow rate of between 15 and 20 gpm. The cooled output hydraulic oil from heat exchanger 33 is returned through a standard flexible hydraulic line 34 and filter 30 (shown in FIG. 1) to the hydraulic oil reservoir 24.

The hydraulic motor 27 preferably functions to provide an overall drive ratio between axle 10 and the output shaft of the hydraulic motor 27 of between approximately 10 to 1 and 11 to 1. The output shaft of the hydraulic motor 27 is coupled to a fan 35. The fan draws air downward from an air vent toward the top of the caboose through the ducting 39, to the heat exchanger 33 which is preferably mounted at an angle across the path of the incoming air. The air drawn further downwardly through the duct formed by the front and sides of the caboose electrical locker and the front surface of the hydraulic oil reservoir 24 to cool the hydraulic motor/alternator unit B and exits through the floor of the caboose. This downward flow thus described provides the desired cooling while acting to prevent road dust from entering the compartment.

The hydraulic motor/fan shaft is further coupled to the shaft of a conventional alternator, preferably rated at 75 volts, 60 amperes.

Referring now to FIG. 4, the voltage regulator E according to the present invention will now be described. The a.c. stator outputs 36a of alternator 36 are connected to rectifiers C, rectified and applied to batteries D for charging. The field or rotor inputs 36b are connected to switching circuitry F for the supply of field excitation.

In normal operation, when there is sufficient alternator output for self-excitation, switching circuitry F applies the rectified alternator output to the alternator field in a controlled manner. Specifically, switching circuitry F comprises a series switch between the field and rectified output of the alternator 36. The field excitation is determined by the percentage on-time of the series switch F. The series switch is turned on and off by the repetitive pulse output from one side of a free running multi-vibrator G whose duty cycle and repetition rate is in turn controlled by a comparator circuit H. The comparator circuit senses the stator output voltage and, if it differs from the desired charging voltage, alters the duty cycle and when appropriate the repetition rate of the free running multi-vibrator and hence the on-time of the series switch and thus the average d.c. excitation to the field from the stator output, in a negative feedback loop.

At low speeds, it is not desirable to attempt to self-excite the alternator. Thus, for start-ups, a start-up circuit or battery switch I is provided to apply battery voltage to the field 36b from a threshold speed corresponding to approximately 10 miles per hour until the stator output exceeds battery voltage. As the speed is increased from zero, the residual magnetism of the pole pieces induces a small stator output voltage. The start-up circuit I monitors the stator output voltage and, when it reaches about one half volt (corresponding to 10 mph), connects the battery D to the field 36b. The stator output voltage then rapidly increases and, when it is equal to the battery voltage, the start-up circuit I disconnects the battery D from the field leaving the field to run on the stator output as aforesaid.

Overload protection circuitry J is provided to limit the field current under two overload conditions. Specifically, if the field windings are accidentally shorted, a shorted field shut-down circuit protective feature limits the current through the switch F. Should the stator output voltage become too large, especially if voltage spikes of relatively high duty cycle should occur, an over-voltage protection circuit alters the duty cycle of the multi-vibrator G to reduce the on-time of the series switch.

Referring now to FIGS. 5a–d, the voltage regulator circuit E will be described in greater detail.

SWITCHING REGULATOR CIRCUITRY

Comparator H and multi-vibrator G are depicted in detail generally on FIG. 5a while switching circuitry F and rectifiers C are depicted in detail generally on FIG. 5b.

Transistors Q1 and Q2 with resistors R2, R3, R14 and R15, and capacitors C1 and C2 form the free running multi-vibrator G, in conjunction with a complimentary Darlington differential formed by transistors Q3a and Q3b, and Q4 and Q5 and resistors R8 and R10. The complimentary Darlington differential is gated by connection of a switching transistor Q16 between the emitters of transistors Q3a and Q3b and the stator output negative. The base bias for transistor Q3a is derived from the voltage divider formed by resistors R11 and R12/R13, while the base bias for transistor Q3b is derived from the voltage divider formed by the Zener diodes D8/D9 and a resistor R7. Diodes D10 and D11 are connected between the bases of transistors Q3a and Q3b to limit overdrive of the differential signal.

An output from the multi-vibrator G at the collector of transistor Q1 is input to the base of a transistor Q6 which, together with the parallel bank of transistors Q7 through Q12 form a Darlington series switch F which switches the field negative connected to their collectors, through the resistors R24 and R29 connected to their emitters, to the rectified stator output negative. An output from the multi-vibrator developed across resistor R16 in the collector circuit of transistor Q2 is connected to the base of Q16 where output steals drive from the base of transistor Q6 of the series switch F.

The free running multi-vibrator G is turned on at the same time that the start-up circuitry connects the battery to the field, by the saturation of Q16, allowing base current to be distributed by the complimentary Darlington differential to Q1 and Q2. The duty cycle and repetition rate of the free running multi-vibrator G is varied by differentially controlling the limited current that must recharge both C1 and C2. When all the current is recharging C1 and C2 recharges only on leakage current from Q1, Q3a and Q4 and vice versa. In this manner, a duty cycle range of greater than $10^6$ to 1 is obtained.

The duty cycle of the multi-vibrator G is controlled by the comparator circuit H as follows: as the rectified stator output volage increases from the desired charging voltage, as determined by resistor R13, a larger amount of the increase is developed across resistor R11 than across Zener diodes D8/9.

The increase in current through transistor Q3b is therefore greater than the increase in current through transistor Q3a. This allows an increased rate of recharging of capacitor C1 through transistor Q5 accompanied by a decreased rate of recharging of capacitor C2 through transistor Q4, so that Q2 on-time is increased and Q1's on-time is decreased. Since transistor Q1's on-time is decreased, the on-time of the Darlington series switch F formed by transistors Q6 through 12 is also decreased reducing the average field current and hence the stator output voltage.

If this process were to alter the duty cycle to the point where either the turn-on or turn-off pulse width to the series switch F was less than the fastest switching speed of the series switch F the multi-vibrator G would turn the series switch off before it was full on or vice versa causing undesirable secondary breakdown. Therefore, when this minimum pulse width corresponding to the fastest switching speed of the series switch F is reached further alteration of the duty cycle is accomplished by decreasing the repetition rate of the multi-vibrator G while maintaining that minimum pulse width as follows. When the turn-on pulse width approaches the minimum safe pulse width, almost all of the recharging current through R9 is being distributed by the complimentary Darlington differential to recharge C1, and recharge current for C2 asymptotically approaches the very small leakage current through Q1, Q3a, and Q4. Thus a small further increase in the recharge current distributed by the Darlington differential to C1 yields a small percentage increase in that current but a large percentage decrease in the recharge current to C2. Hence the recharge rate of C1 is virtually unchanged but the recharge rate of C2 has been greatly decreased since the recharge time and the recharge current are inversely proportional. The turn-off pulse width to the series switch is thus greatly increased while the turn-on pulse width remains at the minimum safe pulse width.

When the series switch F starts to be turned off as transistor Q1 turns off, the collector current of transistor Q2 increases as it turns on and the voltage developed across resistor R16 drives transistor Q13 to clamp the base-emitter junction of Q6, thus turning the series switch off very rapidly.

START-UP CIRCUITRY

The alternator stator outputs 36a are each connected to a series diode D2, D3, D4, respectively, and connected together to form the input to the collector of a transistor Q26 connected as a constant current source, and the output from its emitter is input to the base of a transistor Q27b which, with transistor Q27a, forms an avalanche switch. The output of the switch, from the emitter of Q27b, is connected to the base of Q29 in series with a transistor Q28 connected as a constant current source. Q29 enables the overload protection circuitry J and the multi-vibrator G and also sets the remaining start-up circuitry.

When the stator output reaches about onehalf volt (corresponding to 10 miles per hour), this signal, rectified by D2, D3, D4 and passed by Q26 and filtered by R53 and C8 is sufficient to initiate the turn off of Q27b. As Q27b starts to turn off, current through R55 decreases and since R55, R56 and R57 form a voltage divider the voltage at the base of Q27a decreases and Q27a starts to conduct and steal emitter current from Q27b thereby further reducing the current to R55. This process avalanches until Q27a is in full conduction and Q27b is off. When Q27b shuts of, Q29 loses base drive and shuts off allowing Q28 to: (1) drive a gating transistor Q16 to saturation thus turning on the free running multi-vibrator G (2) drive a transistor Q30, which controls a transistor switch Q31, to saturation so that Q31 loses base drive and is shut off thus removing the short from the capacitor C10 allowing the overload protection circuit J to operate; (3) charge C7 through R46 developing an initial voltage across R46 sufficient to turn on Q24 to the point of saturation.

A transistor Q23 is connected with a transistor Q24 to form a flip-flop. An appropriate base bias voltage is provided for transistor Q23 to ensure that transistor Q23 of the flip-flop is normally conducting during start-up when stator output is below ½ volt. The output from the flip-flop at the collector transistor of Q23 is input to the base of a transistor Q22 which is connected with a transistor Q21 to form a Darlington switch. The output of the Darlington switch at the collectors of transistors Q21 and Q22 is input to the base of a transistor Q20 which is connected with a transistor Q19 as a complimentary Darlington switch.

When Q24 is momentarily saturated by the output of Q28 developed across R46 by the charging current of C7, Q23 loses its base drive and shuts off and hence Q24 remains on. With Q23 off, Q22 drives Q21 into Darlington saturation thus furnishing base drive for Q20. Q20 then drives Q19 into Darlington saturation thereby connecting the battery positive to the positive end of the field winding of the alternator when stator output voltage has reached ½ volt.

OVERLOAD PROTECTION CIRCUITRY

R24 through R29 are connected between the emitters of the series switch transistors Q7 through Q12 and the stator output negative and sense the emitter current of Q7 through Q12. The voltage developed across each of R24 through R29 is averaged by R18 through R23, respectively, and connected to the base of Q14. Should the field windings become temporarily shorted this signal drives the base of Q14 allowing it on a very fast basis to steal sufficient base drive from Q6 to limit the current through Q7 through Q12 to 9 amps which Q7 through Q12 can withstand for a short period without going into undesirable secondary breakdown.

The output from the series switch F at the collectors of transistors Q6 through Q12 is connected through resistor R68 and diode D20 to a capacitor C10. The voltage across capacitor 10 is input to the base of a transistor Q33 which, together with a transistor Q32, is connected to form a Darlington switch. The output from this switch at the collectors of transistors Q32 and Q33 is connected to the base of transistor Q6, the input of the series switch F. An output is taken from the collector of transistor Q2 of the free running multivibrator and inputted to the base of transistor Q34 which is connected across the capacitor C10.

If the shorted field is more than merely very temporary each time the series switch is turned on the collector voltage will increase to greater than the saturation voltage since the series switch is current limited to 9 amps. When the collector voltage on Q7 through Q12 has reached about 35 volts for a time determined by the time constant of resistor R68 and capacitor C10 then capacitor C10 has charged sufficiently to drive transistor Q33 and turn on the Darlington switch Q33/Q32 thereby stealing sufficient base drive from transistor Q6 through resistor R64 to reduce the field current through the series switch to about 1 amp which transistors Q7 through Q12 can withstand continuously. When the series switch is off, transistor Q2 is conducting and its collector is at approximately 75 volts which provides base drive for transistor Q34 through the voltage divider R69/R70 and its output shorts the capacitor C10. Thus, the normal high collector voltage at the series switch when it is off cannot turn on the Darlington switch Q33/Q32.

The Zener diode D5 is connected in series with resistor R30 between field positive and battery negative as over-voltage protection. In the event that field voltage exceed the Zener voltage signal developed across resistor R30 is present at the bases of transistors Q17 and Q18 connected as emitter followers. The outputs from the emitters of transistors Q17 and Q18 are connected through resistors R5 and R6 respectively to the capacitor C5 which filters the base of transistor Q3a of the complimentary Darlington differential to battery negative. Should spurious high voltage spikes of relatively high duty cycle appear on the field windings, than the signal developed across resistor R30 is amplified by transistors Q17 and Q18 and charges capacitor C8 through resistors R5 and R6, providing, after a short time, sufficient base drive for transistor Q15 to switch the base of Q3a to battery negative, causing the multivibrator to change its duty cycle so that the series switch F has its longest possible off-time.

Protection diodes D6a and D6d are connected in parallel between the battery negative and field negative to ensure that on the occurrence of spurious energies in the system field, negative is never more than one diode drop below the battery negative. Protection diodes D6b and D6c are connected in parallel between the field positive and field negative to ensure that the field negative is never more than one diode drop above field positive.

While a particular embodiment of the present invention has been shown and described in detail, it is apparent that adaptations and modifications may occur to those skilled in the art, such adaptations and modifications being within the spirit and scope of the present invention, as set forth in the claims.

What is claimed is:

1. A vehicular battery charging system comprising a hydraulic pump, drive means rotationally coupling said hydraulic pump to a rotating axle of said vehicle, said drive means including a right angle gear drive disposed at one end of said axle and flexible coupling means for rotationally coupling the end of said axle and the input of said right angle gear drive, said hydraulic pump being coupled to the output of said right angle gear drive, a hydraulic motor disposed remote from said hydraulic pump and coupled to the output thereof, an alternator rotationally coupled to said hydraulic motor, and rectifier means for rectifying the a.c. output of said alternator, the output of the alternator from said rectifier means being coupled to said battery for charging.

2. Apparatus according to claim 1 comprising a mounting flange carried between the bearing of said axle and the axle truck, said flexible coupling means being mounted to said flange.

3. Apparatus according to claim 1 wherein said flexible coupling means comprises a pair of parallel spaced-apart plates respectively coupled to the end of said axle and the input of said right angle gear drive and a resilient half-torus connecting said plates to transmit rotation therebetween.

4. Apparatus according to claim 1 wherein said right angle gear drive comprises straight-cut ring and pinion gears, the input said right angle drive being connected to said ring gear and the output thereof being connected to said pinion gear.

5. Apparatus according to claim 4 wherein said right angle gear drive comprises an internal oil pump rotationally coupled to said ring gear, the output of said oil pump being directed to the bearing of said pinion gear.

6. Apparatus according to claim 1 wherein said hydraulic pump is bi-directional to produce positive pressure at the output for either direction of rotation.

7. Apparatus according to claim 6 wherein said hydraulic pump has a relatively constant output flow rate over the operating range of rotation.

8. Apparatus according to claim 1 comprising a hydraulic oil reservoir having an outlet connected to the input of said hydraulic motor and an inlet coupled to the output of said hydraulic motor.

9. Apparatus according to claim 8 comprising a heat exchanger coupling the output of said hydraulic motor and the inlet of said reservoir.

10. Apparatus according to claim 9 comprising a fan rotationally coupled to said hydraulic motor, said heat exchanger being disposed adjacent said fan for cooling.

11. Apparatus according to claim 10 wherein said reservoir comprises a thin rectangular hydraulic oil tank, said heat exchanger, alternator and hydraulic motor being mounted to said tank in a vertical arrangement with said heat exchanger disposed above said fan, the air flow produced by said fan being directly downwardly drawing cooling air through said heat exchanger.

12. Apparatus according to claim 8 comprising a pressure relief valve disposed between said hydraulic pump and said hydraulic motor, the pressure relief output thereof being connected to said reservoir.

13. Apparatus according to claim 1 comprising a voltage regulator circuit for controlling the output voltage of said alternator to a predetermined battery charging voltage including comparator means for comparing the rectified alternator output with a reference voltage to produce a control signal, a free running multivibrator having a repetitive pulse output, control means for varying the duty cycle of said multivibrator in response to the control signal from said comparator means and switch means for intermittently coupling the rectified alternator output to the field of said alternator in response to the repetitive pulse output of said multivibrator.

14. Apparatus according to claim 13 wherein said free running multivibrator includes a pair of feedback capacitors and wherein said control means comprises a complimentary Darlington differential circuit, the outputs thereof being respectively connected to said pair of capacitors to control the charging thereof.

15. A variable duty cycle free running multivibrator circuit comprising a first pair of transistors, a pair of capacitors, said first pair of transistors and said capacitors being connected in free running multivibrator configuration and second and third pairs of transistors respectively connected in complimentary Darlington differential configuration with the outputs thereof respectively connected to said capacitors to control the charging thereof, the differential inputs of said complimentary Darlington differential thereby controlling the duty cycle of said multivibrator.

16. A vehicular battery charging system comprising a hydraulic pump, drive means rotationally coupling said hydraulic pump to a rotating member of said vehicle, a hydraulic motor disposed remote from said hydraulic pump and coupled to the output thereof, an alternator rotationally coupled to said hydraulic motor, rectifier means for rectifying the a.c. output of said alternator, the output of the alternator from said rectifier means being coupled to said battery for charging, and a voltage regulator circuit for controlling the output voltage of said alternator to a predetermined battery charging voltage including comparator means for comparing the rectified alternator output with a reference voltage to produce a control signal, a free running multivibrator having a repetitive pulse output, and a pair of feedback capacitors, control means for varying the duty cycle of said multivibrator in response to the control signal from said comparator means, said control means including a complimentary Darlington differential circuit, the outputs thereof being respectively connected to said pair of capacitors to control the charging thereof, and switch means for intermittently coupling the rectified alternator output to the field of said alternator in response to the repetitive pulse output of said multivibrator.

17. A vehicular battery charging system comprising a hydraulic pump, drive means rotationally coupling said hydraulic pump to a rotating axle of said vehicle, said drive means including a right angle gear drive disposed at one end of said axle and flexible coupling means for rotationally coupling the end of said axle and the input of said right angle gear drive, the flexible coupling means including a pair of parallel spaced-apart plates respectively coupled to the end of said axle and the input of said right angle gear drive and a resilient half-torus connecting said plates to transmit rotation therebetween, said hydraulic pump being coupled to the output of said right angle gear drive, a hydraulic motor disposed remote from said hydraulic pump and coupled to the output thereof, an alternator rotationally coupled to said hydraulic motor, and rectifier means for rectifying the a.c. output of said alternator, the output of the alternator from said rectifier means being coupled to said battery for charging.

* * * * *